US012463329B2

(12) United States Patent
Wayton

(10) Patent No.: US 12,463,329 B2
(45) Date of Patent: Nov. 4, 2025

(54) MULTI-BAND ANTENNA ARRAY FACE AND RADIATOR CONFIGURATION FOR MITIGATING INTERFERENCE

(71) Applicant: JOHN MEZZALINGUA ASSOCIATES, LLC, Liverpool, NY (US)

(72) Inventor: Evan Wayton, Tully, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

(21) Appl. No.: 18/755,204

(22) Filed: Jun. 26, 2024

(65) Prior Publication Data

US 2024/0429594 A1 Dec. 26, 2024

Related U.S. Application Data

(63) Continuation of application No. 17/794,140, filed as application No. PCT/US2021/012153 on Jan. 5, 2021, now Pat. No. 12,046,803.

(60) Provisional application No. 62/963,692, filed on Jan. 21, 2020.

(51) Int. Cl.

| | |
|---|---|
| ***H01Q 1/24*** | (2006.01) |
| ***H01Q 1/52*** | (2006.01) |
| ***H01Q 5/42*** | (2015.01) |
| ***H01Q 5/48*** | (2015.01) |
| ***H01Q 21/26*** | (2006.01) |

(52) U.S. Cl.
CPC ............. *H01Q 1/246* (2013.01); *H01Q 1/521* (2013.01); *H01Q 5/42* (2015.01); *H01Q 5/48* (2015.01); *H01Q 21/26* (2013.01)

(58) Field of Classification Search
CPC .......... H01Q 1/246; H01Q 1/52; H01Q 1/521; H01Q 1/523; H01Q 1/525; H01Q 1/526; H01Q 5/40; H01Q 5/42; H01Q 5/48; H01Q 5/49; H01Q 21/26; H01Q 21/28
See application file for complete search history.

(56) References Cited

U.S. PATENT DOCUMENTS

2020/0067197 A1* 2/2020 Tang ...................... H01Q 9/285

* cited by examiner

*Primary Examiner* — Robert Karacsony
(74) *Attorney, Agent, or Firm* — Meunier Carlin & Curfman LLC

(57) ABSTRACT

Disclosed is a multiband antenna having a plurality of low band radiators, a plurality of mid band radiators, and a plurality of high band radiators. The high band radiators are disposed in a column between two adjacent low band radiators. Each of the low band radiators has a plurality of inward dipole arms and a plurality of outward dipole arms, wherein the inward dipole arms and the outward dipole arms have a different structure. The inward dipole arm structure is designed to minimize interference and shading with the high band radiators. Each of the mid band radiators has a parasitic disk with a plurality of cloaking slots.

9 Claims, 8 Drawing Sheets

MULTI-BAND ANTENNA ARRAY FACE AND RADIATOR CONFIGURATION FOR MITIGATING INTERFERENCE

CROSS REFERENCE TO RELATED APPLICATIONS

This application is a continuation of U.S. patent application Ser. No. 17/794,140, filed Jul. 20, 2022, which is a U.S. National Stage application filed under 35 U.S.C. § 371 of PCT/US2021/012153 filed Jan. 5, 2021, which claims priority to U.S. Provisional Patent Application Ser. No. 62/963,692, filed Jan. 21, 2020, which applications are hereby incorporated by this reference in their entireties as if fully set forth herein.

BACKGROUND OF THE INVENTION

Field of the Invention

The present invention relates to wireless communications, and more particularly, to compact multi-band antennas.

Related Art

The introduction of additional spectrum for cellular communications, such as the Citizens Broadband Radio Service (CBRS), opens up vast resources of additional capacity for existing cellular customers as well as new User Equipment (UE) types. New UE types include Internet of Things (IoT) devices, drones, and self-driving vehicles. Further, the advent of CBRS enables a whole new cellular communication paradigm in private networks.

Accommodating CBRS in existing LTE and 5G cellular networks requires enhancing antennas to operate in 3550-3700 MHz, in addition to LTE low band and (now mid) bands in the range of 700 MHz and 2.3 GHz, respectively. A challenge arises in integrating CBRS radiators into antennas designed to operate in the existing lower bands in that energy radiated by the CBRS radiators may cause resonances in the lower band radiators. A particular problem may arise in the low band radiators that are in close proximity to the CBRS radiators whereby the low band radiators may significantly degrade the performance of the antenna in the CBRS band. A conventional solution to this problem is to increase the area of the antenna array face to accommodate the new CBRS radiators. However, this may be impractical due to space constraints on the antennas.

Accordingly, what is needed is an array face configuration and low band radiator design that mitigates the low band interference problem while not increasing the area of the array face of the antenna.

SUMMARY OF THE INVENTION

An aspect of the present invention involves a multiband antenna. The multiband antenna comprises an array of high band radiators arranged in at least one column, the array of high band radiators having an outer high band radiator at each end of the array; a plurality of low band radiators, the low band radiators having at least one inward dipole arm and at least one outer dipole arm, wherein the at least one inward dipole arm has a structure that is different from an at least one outer dipole arm structure, and wherein an adjacent outer high band radiator is partly obstructed by the at least one inward dipole arm; and a plurality of mid band radiators, each of the mid band radiators having a mid band parasitic disk having a plurality of cloaking slots.

DESCRIPTION OF EXEMPLARY EMBODIMENTS

Figure 1:
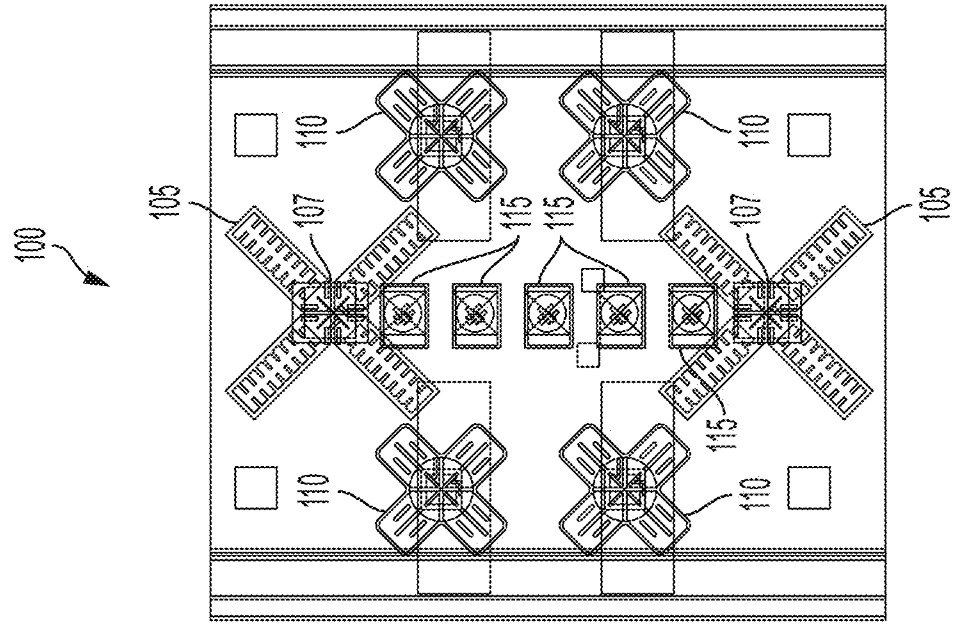
FIG. 1 illustrates an exemplary array face incorporating low band, mid band, and CBRS radiators in which standard low band radiators are deployed.

FIG. 1 illustrates an exemplary array face 100 incorporating low band radiators 105, mid band radiators 110, and CBRS or high band radiators 115. As illustrated, the CBRS radiators 115 are integrated into array face 100 to provide optimal performance in the CBRS bands, although the outer CBRS radiators of the cluster are partly obstructed by the inward-directed dipole arms of the low band radiators 105. This obstruction, or shadowing, effects the performance of the outer CBRS radiators 115, thereby corrupting the antenna's gain pattern in the CBRS bands.

Figure 2:
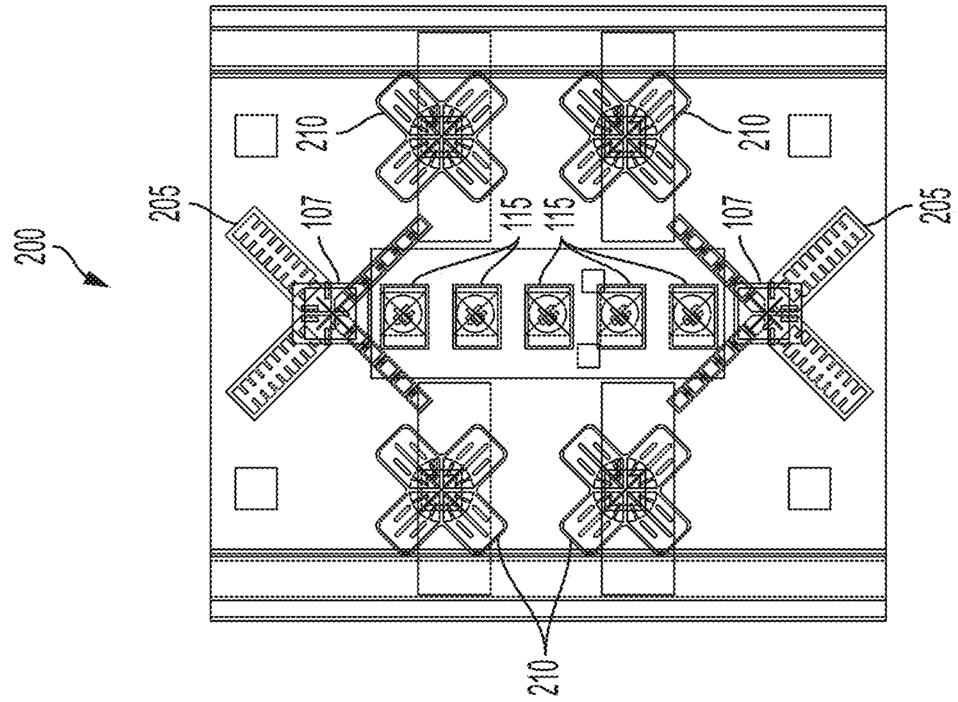
FIG. 2 illustrates the exemplary array face of FIG. 1, but with exemplary low band radiators and mid band radiators according to the disclosure.

FIG. 2 illustrates the exemplary array face 200 according to the disclosure. As illustrated, the placement of the radiators remains unchanged. Further illustrated are two asymmetric low band radiator 205 according to the disclosure. Each asymmetric low band radiator 205 has inward-directed dipole arms that mitigate obstruction or shadowing with the outer CBRS radiators 115. Further illustrated are exemplary mid band radiators 210 according to the disclosure.

Figure 3B:
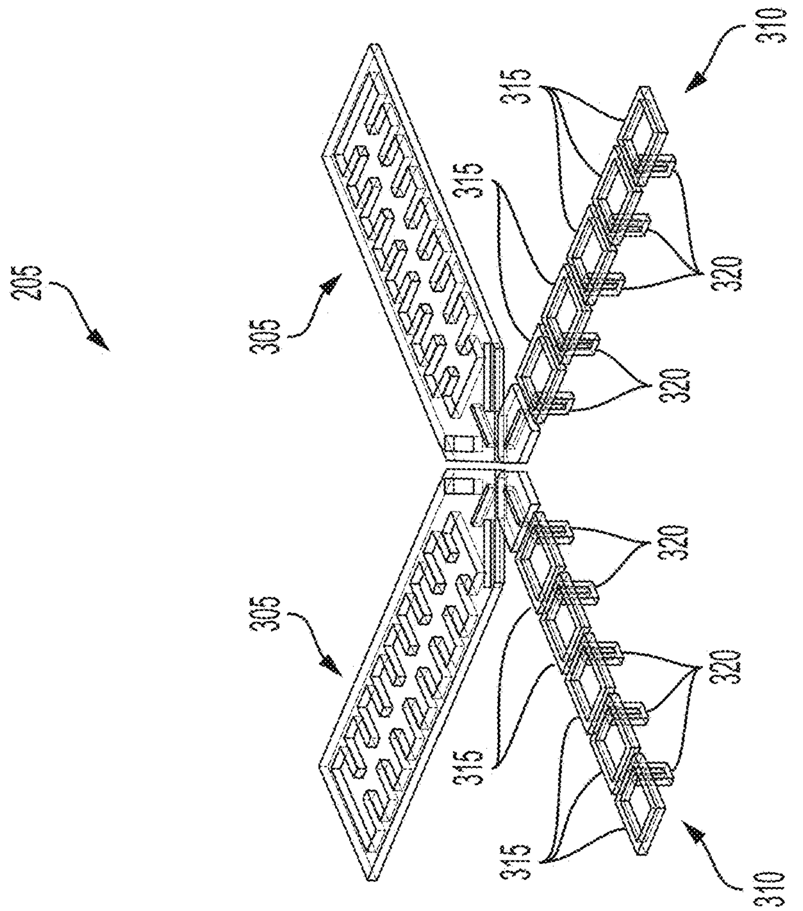
FIG. 3B is another view of an exemplary asymmetric low band radiator according to the disclosure.
Figure 3A:
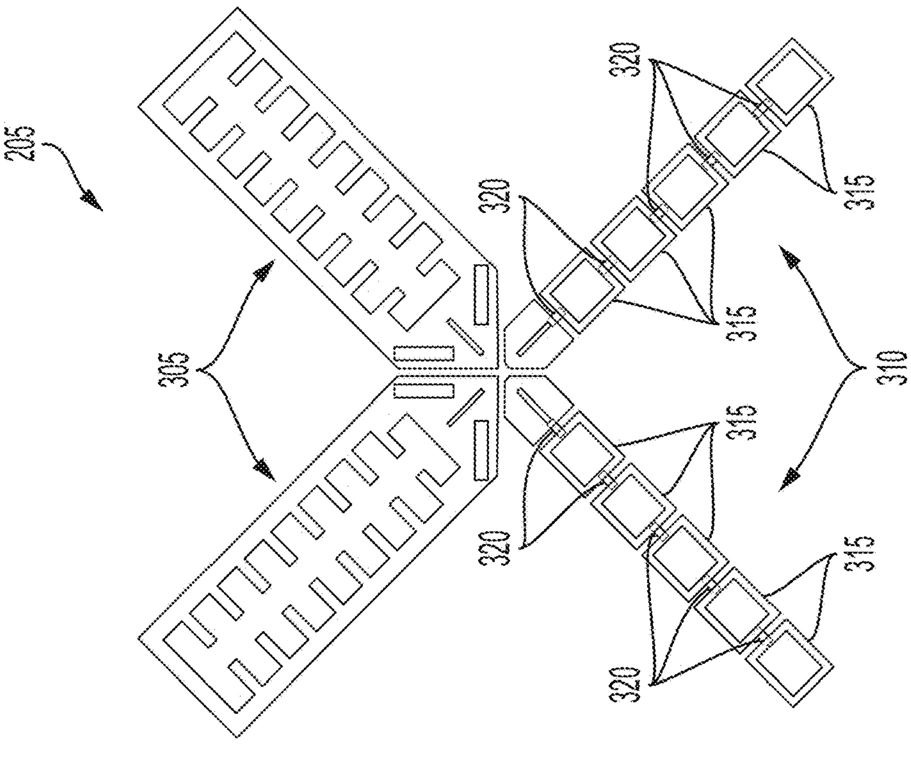
FIG. 3A is a top-down view of an exemplary asymmetric low band radiator according to the disclosure.

FIGS. 3A and 3B are different views of an exemplary asymmetric low band radiator 205 according to the disclosure. Asymmetric low band radiator 205 has two outward-directed standard dipole arms 305 and two inward-directed dipole arms 310 that are designed to minimize interference with the CBRS radiators 115. Each inward-directed dipole arms 310 has a plurality of radiative segments 315 coupled by linking inductive segments 320. The inductive segments 320 both mechanically and electrically couple the radiative segments 315 together. The inductive segments 320 may point "downward", orthogonally to the plane defined by the inward-directed dipole arms 310 and standard dipole arms 305 (hereinafter "radiator plane"). The radiative segments 315 and inductive segments 320 may be formed of a single piece of aluminum, although other materials may be used given sufficient conductivity and mechanical strength.

Figure 4:
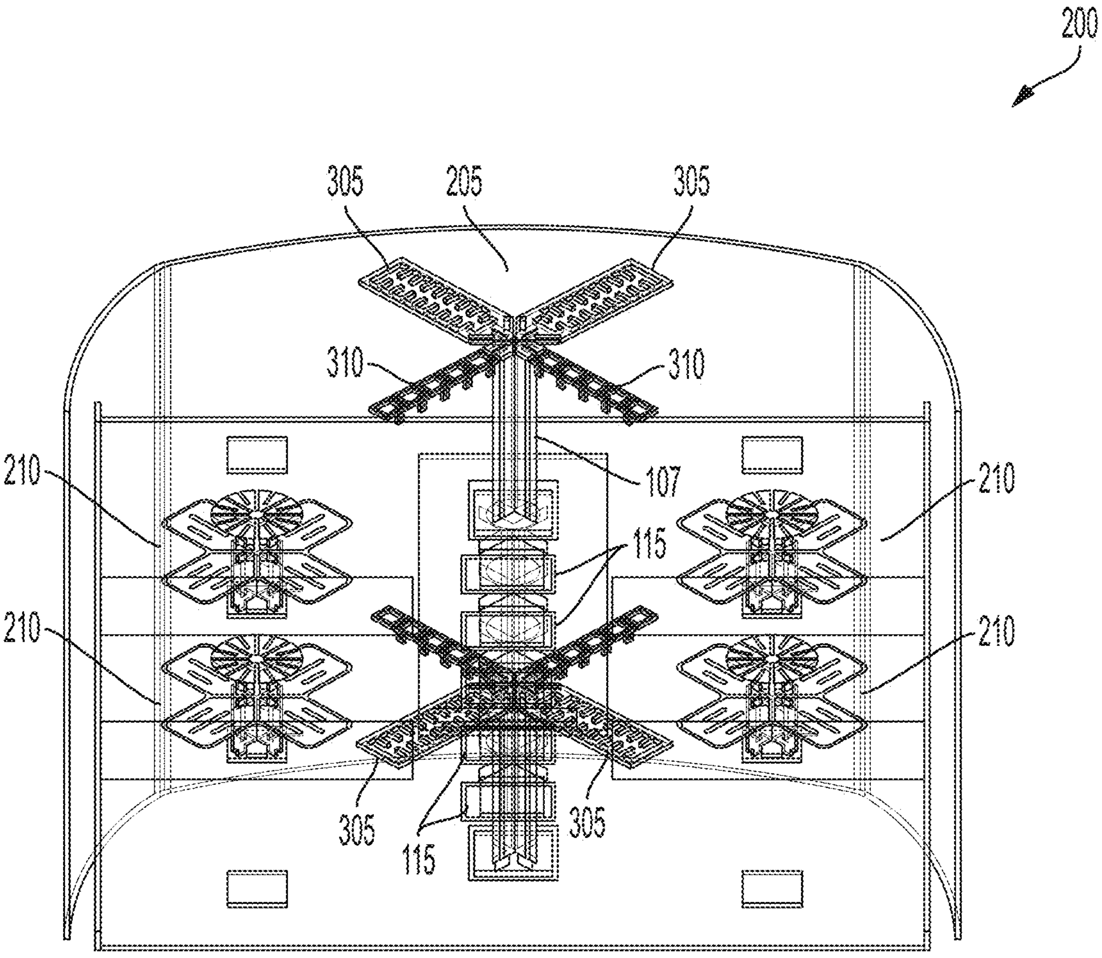
FIG. 4 is an alternate view of an exemplary array face incorporating an exemplary asymmetric low band radiator according to the disclosure as well as an exemplary mid band parasitic disk radiator according to the disclosure.

FIG. 4 is an alternate view of an exemplary array face 200 incorporating two exemplary asymmetric low band radiators 205 according to the disclosure and exemplary mid band radiators 210. As illustrated, the asymmetric low band radiators 205 are mounted to balun stems 107, and the inductive segments 320 of the inward-directed dipole arms 310 point toward the array face 200.

Figure 5B:
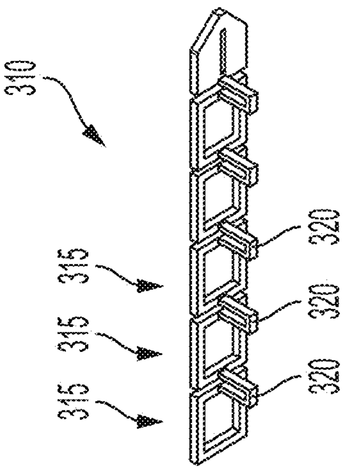
FIGS. 5A-D illustrate a first embodiment of a low-interference dipole arm of an exemplary asymmetric low band radiator according to the disclosure.
Figure 5D:
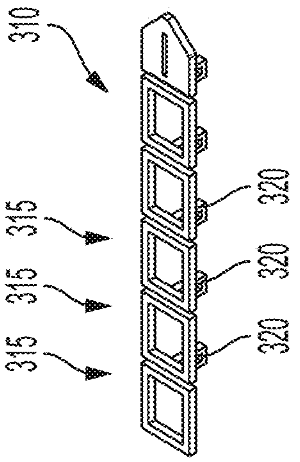
Figure 5A:
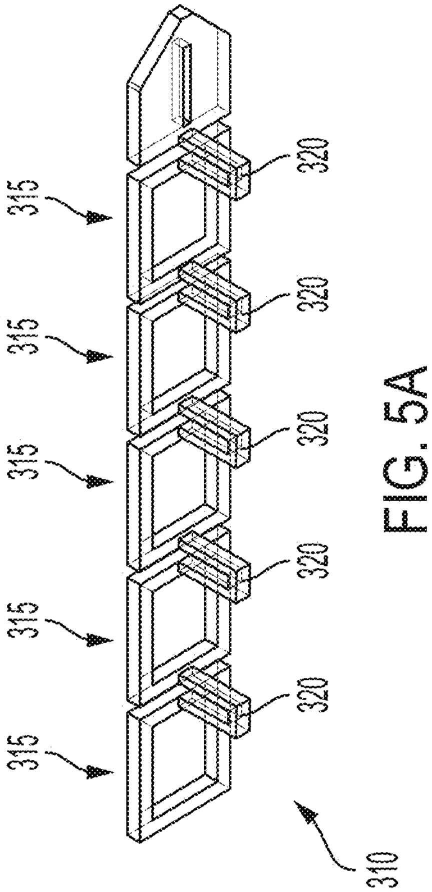
Figure 5C:
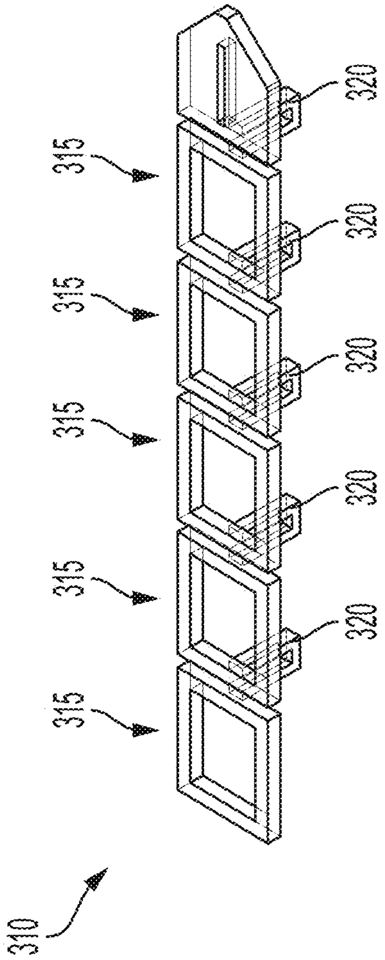

FIGS. 5A-D illustrate a first exemplary embodiment of an inward-directed dipole arm 310 of an exemplary asymmetric low band radiator 205 according to the disclosure. FIG. 5A is a transparent line drawing of inward-directed dipole arm 310 from a position below it relative to the array face 200, and FIG. 5B is a solid figure drawing of the inward-directed dipole arm 310 from the same perspective. FIG. 5C is a transparent line drawing of inward-directed dipole arm 310 from a position above it relative to the array face 200, and FIG. 5D is a solid figure drawing of the inward-directed dipole arm 310 from the same perspective. Illustrated are radiative segments 315 and inductive segments 320.

Figure 6B:
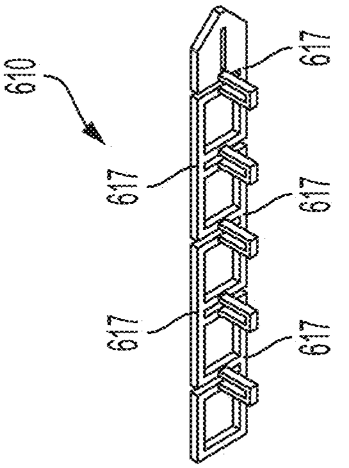
FIGS. 6A-D illustrate a second embodiment of a low-interference dipole arm of an exemplary asymmetric low band radiator according to the disclosure.
Figure 6D:
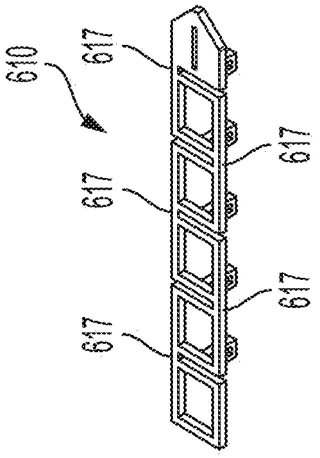
Figure 6A:
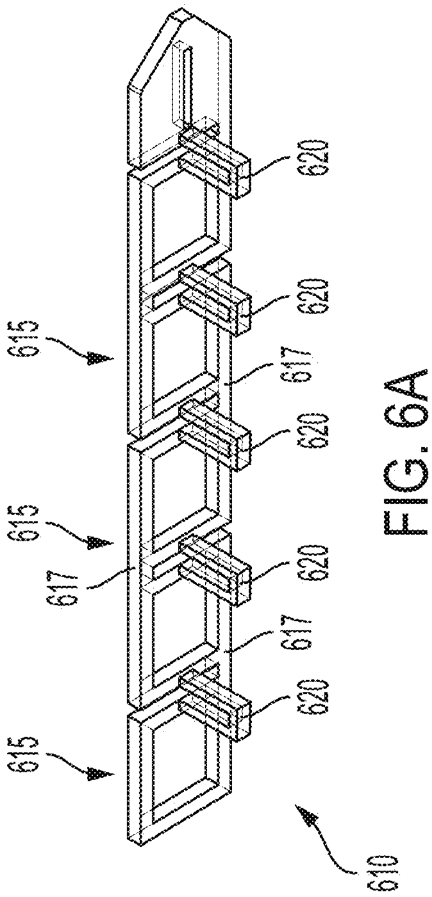
Figure 6C:
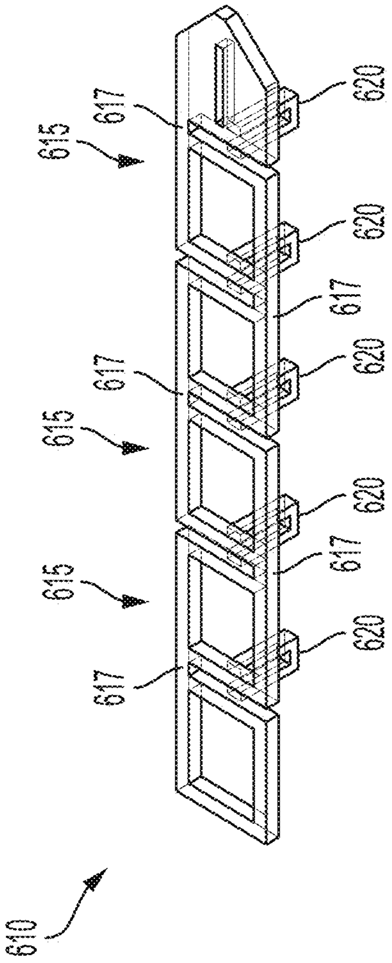

FIGS. 6A-D illustrate a second exemplary embodiment of an inward-directed dipole arm 610 according to the disclosure. FIG. 6A is a transparent line drawing of inward-directed dipole arm 610 from a position below it relative to the array face 200, and FIG. 6B is a solid figure drawing of the inward-directed dipole arm 610 from the same perspective. FIG. 6C is a transparent line drawing of inward-directed dipole arm 610 from a position above it relative to the array face 200, and FIG. 6D is a solid figure drawing of the inward-directed dipole arm 610 from the same perspective. Illustrated are radiative segments 615 and inductive segments 620.

Figure 7B:
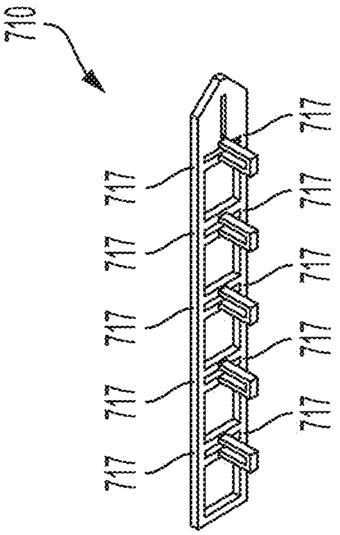
FIGS. 7A-D illustrate a third embodiment of a low-interference dipole arm of an exemplary asymmetric low band radiator according to the disclosure.
Figure 7D:
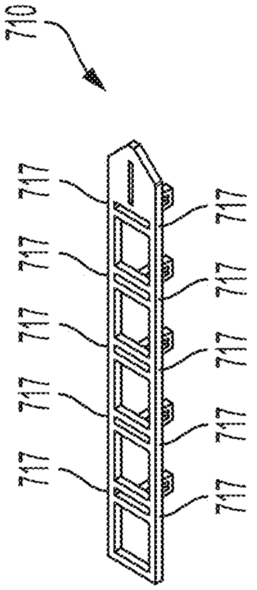
Figure 7A:
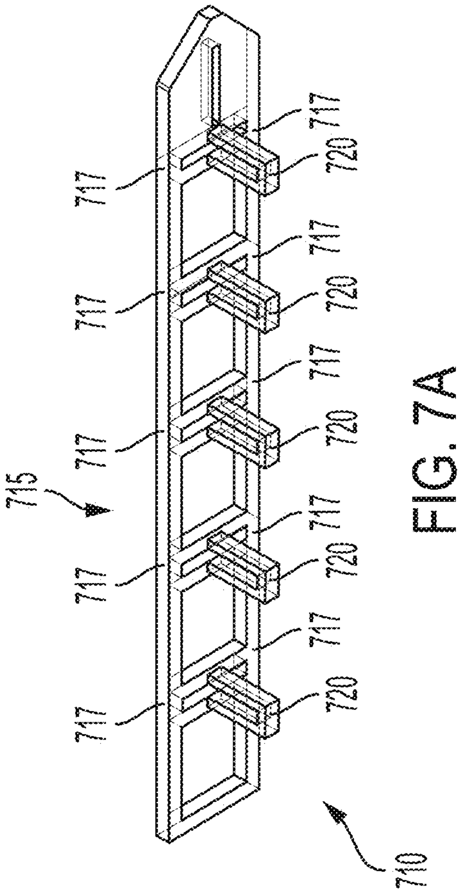
Figure 7C:
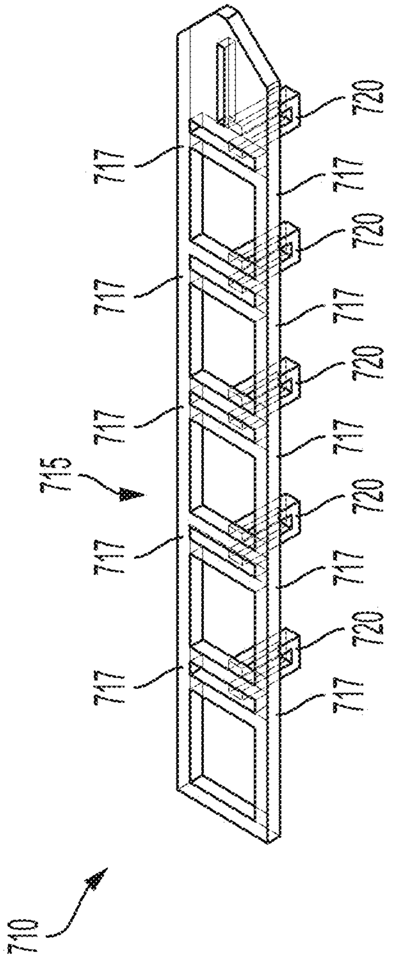

FIGS. 7A-D illustrate a third exemplary embodiment of an inward-directed dipole arm 710 according to the disclosure. FIG. 7A is a transparent line drawing of inward-directed dipole arm 710 from a position below it relative to the array face 200, and FIG. 7B is a solid figure drawing of the inward-directed dipole arm 710 from the same perspective. FIG. 7C is a transparent line drawing of inward-directed dipole arm 710 from a position above it relative to the array face 200, and FIG. 7D is a solid figure drawing of the inward-directed dipole arm 710 from the same perspective. Illustrated are radiative segments 715 and inductive segments 720.

The differences between embodiments 310, 610, and 710 include the following. Inward-directed dipole arm 310 has radiative segments 315 that are mechanically coupled solely by inductive segments 320. Having the inductive segments 315 as the sole electrical coupling between radiative segments 315 provides for maximum cloaking and thus interference mitigation. However, having the inductive segments 315 as the sole mechanical coupling between radiative segments 315 may make this embodiment of inward-directed dipole arm 315 susceptible to vibration and mechanical deformation relative to dipole arms 610 and 710. Inward-directed dipole arm 610 has radiative segments 615 that are electrically and mechanically by inductive segments 620 as well as an in-plane coupling element 617, which couple adjacent radiative segments 615 on alternating sides. The presence of in-plane coupling elements 617 provides for improved mechanical rigidity but at the expense of performance in the CBRS gain pattern. Similarly, inward-directed dipole arm 710 has radiative segments 715 that are electrically and mechanically by inductive segments 720 as well as an in-plane coupling element 717, which couple adjacent radiative segments 715 on both sides. The presence of in-plane coupling elements 717 provide for improved mechanical rigidity—more so than inward-directed dipole arm 610—but further at the expense of performance in the CBRS gain pattern. It will be understood that such variations are possible and within the scope of the disclosure.

Figure 8:
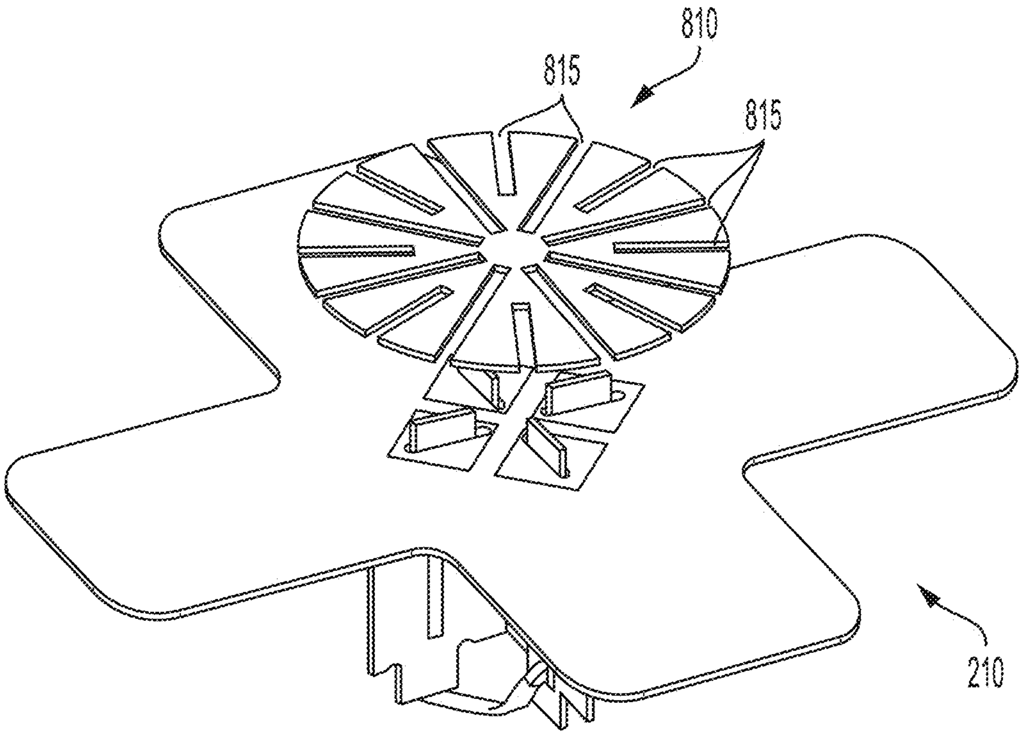
FIG. 8 illustrates a mid band radiator having an exemplary mid band parasitic disk according to the disclosure.
Figure 9:
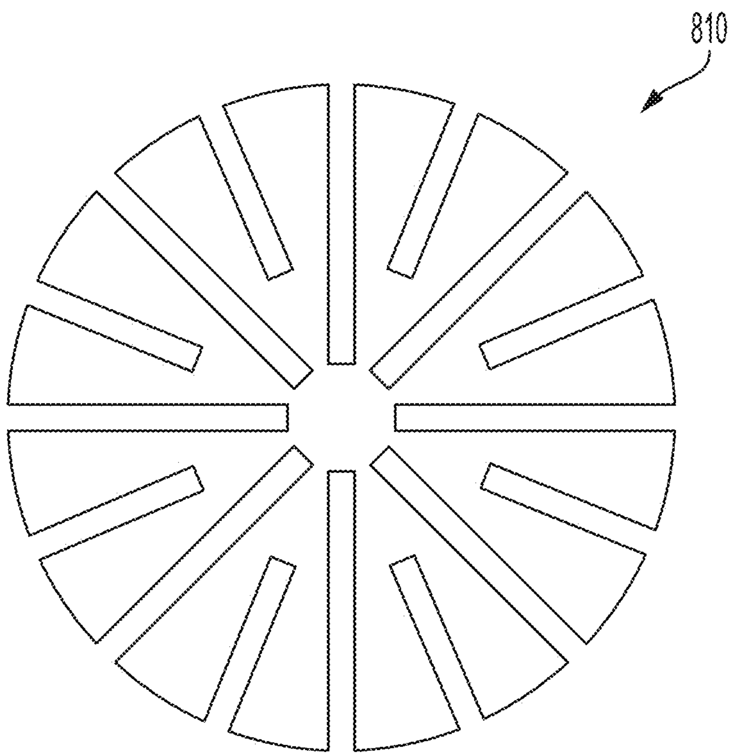
FIG. 9 illustrates a mid band parasitic disk according to the disclosure.

FIG. 8 illustrates an exemplary mid band radiator 210 according to the disclosure. Mid band radiator 210 includes an exemplary parasitic disk 810 having cloaking slots 815 formed therein to prevent the mid band radiator 210 from coupling with emissions from the high band radiators 115. A conventional mid band parasitic radiator within mid band radiator 110 of FIG. 1 suffers the deficiency of resonating with the high band radiators 115. The presence of cloaking slots 815 in exemplary mid band parasitic radiator 810 substantially prevents this resonance, thereby improving the gain pattern of the array of CBRS (high band) radiators 115 in antenna array face 200.

What is claimed is:

1. A multiband antenna configured to operate in a first frequency band and a second frequency band, wherein the first frequency band has a lower center frequency than the second frequency band, the multiband antenna having a first radiator configured to radiate in the first frequency band, the first radiator comprising:

a pair of inward dipole arms, each having a first structure comprising (i) a plurality of radiative segments and (ii) a plurality of inductive segments, wherein the inductive segments mechanically and electrically couple the radiative segments together, and wherein each of the inductive segments is oriented in a plane orthogonal to a radiator plane; and a pair of outward dipole arms, each having a second structure, wherein each inward dipole arm and each outward dipole arm is formed of a first single piece of metal, wherein the first structure is configured to mitigate shadowing with a corresponding nearby second radiator, wherein the second radiator is configured to radiate in the second frequency band.

2. The multiband antenna of claim 1, wherein the first structure is narrower than the second structure in a radiator plane.

3. The multiband antenna of claim 1, wherein the metal comprises aluminum.

4. The multiband antenna of claim 3, wherein the first structure further comprises a plurality of in-plane coupling elements, each of the in-plane coupling elements is disposed between two adjacent radiative elements, wherein each in-plane coupling elements mechanically and electrically couples the two adjacent radiative elements.

5. A multiband antenna configured to operate in a first frequency band and a second frequency band, wherein the first frequency band has a lower center frequency than the second frequency band, the multiband antenna having a first radiator configured to radiate in the first frequency band, the first radiator comprising:

a first pair of dipole arms, each having a first structure comprising (i) a plurality of radiative segments and (ii) a plurality of inductive segments, wherein the inductive segments mechanically and electrically couple the radiative segments together, and wherein each of the inductive segments is oriented in a plane orthogonal to a radiator plane; and a second pair of dipole arms, each having a second structure, wherein each inward dipole arm and each outward dipole arm is formed of a first single piece of aluminum, wherein the first structure is configured to mitigate shadowing with a corresponding nearby second radiator, wherein the second radiator is configured to radiate in the second frequency band.

6. The multiband antenna of claim 5, wherein the first pair of dipole arms are oriented in an inward direction.

7. The multiband antenna of claim 6, wherein the second pair of dipole arms are oriented in an outward direction.

8. The multiband antenna of claim 5, wherein the first structure is narrower than the second structure in a radiator plane.

9. The multiband antenna of claim 8, wherein the first structure further comprises a plurality of in-plane coupling elements, each of the in-plane coupling elements is disposed between two adjacent radiative elements, wherein each in-plane coupling elements mechanically and electrically couples the two adjacent radiative elements.

* * * * *